(12) United States Patent
Pantano et al.

(10) Patent No.: US 12,217,877 B2
(45) Date of Patent: Feb. 4, 2025

(54) LIQUID METAL COOLED NUCLEAR REACTOR INCORPORATING A FULLY PASSIVE DECAY HEAT REMOVAL SYSTEM WITH A MODULAR COLD SOURCE

(71) Applicant: COMMISSARIAT A L'ENERGIE ATOMIQUE ET AUX ENERGIES ALTERNATIVES, Paris (FR)

(72) Inventors: Alessandro Pantano, Aix en Provence (FR); Laurent Brissonneau, Venelles (FR); Jérôme Pouvreau, Biviers (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 140 days.

(21) Appl. No.: 17/901,911

(22) Filed: Sep. 2, 2022

(65) Prior Publication Data

US 2023/0106712 A1    Apr. 6, 2023

(30) Foreign Application Priority Data

Oct. 5, 2021 (FR) ..................... 21 10509

(51) Int. Cl.
*G21C 15/18* (2006.01)
*G21C 1/03* (2006.01)

(52) U.S. Cl.
CPC .............. *G21C 15/18* (2013.01); *G21C 1/03* (2013.01); *G21C 15/185* (2019.01)

(58) Field of Classification Search
CPC ......... G21C 15/18; G21C 1/03; G21C 15/185
USPC ....................................... 376/299
See application file for complete search history.

(56) References Cited

U.S. PATENT DOCUMENTS

2021/0210229 A1    7/2021  Gauthe et al.

FOREIGN PATENT DOCUMENTS

| CN | 103923612 B | 10/2017 |
| FR | 3 104 311 A1 | 6/2021 |
| JP | 2013-076675 A | 4/2013 |
| KR | 10-2015-0108999 A | 10/2015 |

OTHER PUBLICATIONS

Preliminary French Search Report issued May 11, 2022 in French Application 21 10509 filed on Oct. 5, 2021, 3 pages (with English Translation of Categories of Cited Documents).
Edouard et al., "ASTRID Nuclear Island design update in French-Japanese joint team development of Decay Heat Removal systems", ICAPP, 2018, 7 pages.

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A nuclear reactor incorporates a fully passive decay heat removal system with a modular cold source. The decay heat removal system is configured to remove heat passively, via the outside of a primary vessel included in the nuclear reactor. The cold source has a plurality of modules grouped together in assemblies. Each module is filled with a phase change material. Each module is cooled by a monotube heat exchanger. The decay heat removal system includes a hot collector and a cold collector to ensure the distribution of a heat transfer fluid in the plurality of monotube heat exchangers.

11 Claims, 6 Drawing Sheets

LIQUID METAL COOLED NUCLEAR REACTOR INCORPORATING A FULLY PASSIVE DECAY HEAT REMOVAL SYSTEM WITH A MODULAR COLD SOURCE

TECHNICAL FIELD

The present invention relates to the field of liquid metal cooled fast neutron nuclear reactors, notably sodium fast reactors, referred to as SFRs or Na-cooled FNRs, and which forms part of the family of reactors referred to as fourth generation.

More particularly, the invention concerns an improvement in the decay heat removal function of these nuclear reactors.

The invention applies in particular to small modular reactors (SMR), which typically have an operating power of between 50 and 200 MWe.

It will be recalled here that the decay heat of a nuclear reactor is the heat that is produced by the core after the nuclear chain reaction has stopped and that is constituted by the decay energy of the fission products.

Although it is described with reference to a liquid sodium cooled nuclear reactor, the invention applies to any other liquid metal, such as lead, as heat transfer fluid in a primary circuit of a nuclear reactor.

PRIOR ART

In nuclear reactors, the basic safety functions that must be ensured at all times are containment, control of the reactivity, and removal of the heat and of the decay heat.

To remove the decay heat, efforts are constantly being made to improve the passivity and diversification of systems to ensure better overall reliability. The aim is to preserve the integrity of the structures, specifically the first (fuel assembly cladding) and second (main vessel) containment barriers, even in the event of a station blackout over a long period of time, which corresponds to a Fukushima-type scenario.

More particularly, the removal of the decay heat from a liquid metal cooled reactor in a completely passive way through the main vessel is currently envisaged. Although this aim appears to be impossible to achieve for a large reactor, because the power is too high, it can realistically be considered for low-power SMRs in order to ensure an intrinsic improvement in the safety of decay heat removal, through the main vessel, and the decay heat removal systems, referred to below as DHR systems.

The DHR systems currently used in sodium cooled reactors are not completely passive, because in fact they make use of an instrumentation and control system and/or human intervention. In addition, these systems often use sodium flow circuits with a cold air source that can exhibit failures. Moreover, the current systems do not have diversified solutions with respect to the heat sinks providing the final cooling of the reactor in the event of an accident, also denoted final cold source. They can be sensitive to internal and external attacks and malevolent actions.

The DHR systems that already exist or are known in the literature can generally be placed in three categories:

A/ those arranged in the loops upstream of the energy conversion system;
B/ those arranged at least partially inside the primary vessel of the reactor;
C/ those arranged outside the primary or secondary vessel of the reactor.

The A/ systems release heat to liquid metal/air exchangers: [1]. The major drawbacks of these systems are that they need a minimum of two exchangers to be implemented, operate on a mainly active basis by forced convection with weak natural convection performance, and necessitate the use of a final cold source of the liquid metal/air exchanger type, entailing risks of chemical interaction in the event of leaks of the liquid metal and external attack on the final cold source.

The B/ systems likewise release the removed heat to a final cold source of the liquid metal/air exchanger type.

Some of these B/ systems consist in arranging either the cold collector, or the hot collector, inside the primary vessel: [1]. Besides the major drawbacks mentioned above for the A/ systems, they also run the risk of contact with the radioactive liquid metal in the vessel, and require the reactor to be shut down in the event of handling the constituent components of these B/ systems.

The patent application JP2013076675A also discloses a B/ system presented as a passive cooling system, part of which passes through the slab. The proposed solution has numerous drawbacks, namely the leaktightness to be provided through the slab, the possible transfer of heat to the dome, the need to shut down the reactor in the event of handling the components of the system, and the additional weight to be supported by the slab.

The C/ systems comprise exchangers, bundles of pipes, or air flows which are arranged outside the primary or secondary vessel.

The known C/ systems outside the secondary vessel have the following major drawbacks:
- necessarily active operation, that is to say by forced convection;
- limited efficiency because the internal fluid used (thermal oil) is not a good heat transfer medium;
- chemical instability of the heat transfer fluid at temperatures above 300-350° C.;
- low cooling performance since it is carried out by radiation from the secondary vessel.

The patent application JP2013076675A mentioned above discloses a C/ system outside the secondary vessel: it comprises a heat collector and downflow and upflow passages, around the primary vessel, formed between the heat collector and a silo and between the heat collector and a guard vessel, respectively, outside air being introduced into the downflow passage in order to flow downward, and then upward to the bottom of the silo before finally being discharged to the outside. The design of this system involves the drawbacks mentioned above, specifically lower efficiency, since air is not a good heat transfer medium, and lower cooling performance since it is carried out by the secondary vessel. Moreover, there is a risk of external attack on the final cold source, which is exposed to the outside.

The patent application KR20150108999 A discloses a C/ system outside the secondary vessel. Here, too, the final cold source is exposed to the outside. In addition, the solution disclosed has numerous deficiencies. First of all, the components of the system must be welded to the secondary vessel. Moreover, the operation of the system requires a phase transition of the heat transfer fluid, thereby resulting in a great variation in density and therefore mechanical stresses within the pipework, and it is inefficient in the phase preceding the puncturing of the vessel and the core meltdown.

In the application FR3104311A1, the applicant has proposed a liquid metal cooled nuclear reactor incorporating a DHR system with a cold source utilizing phase change material (PCM), which overcomes the drawbacks of the A/, B/ and C/ systems mentioned above, with no or only very little modification of the nuclear reactors, including their buildings. The solution proposed for the cold source in the aforementioned patent application is not entirely satisfactory for the following reasons:

the heat distribution in the PCM is not optimal;
full consideration is not given to thermal expansion of the structures;
it is difficult to implement;
it can be difficult to handle, replace and inspect the PCM;
the compactness of the cold source is insufficient.

There is therefore a need to improve the DHR systems of liquid metal cooled nuclear reactors, in particular to improve the solution proposed in the patent application FR3104311A1.

DISCLOSURE OF THE INVENTION

To do this, one of the aspects of the invention relates to a liquid metal cooled fast neutron nuclear reactor, comprising:

a vessel referred to as primary vessel, filled with a liquid metal as heat transfer fluid of the primary circuit of the reactor;
a vessel pit arranged around the primary vessel defining a space between vessels;
a closure slab for confining the liquid metal inside the primary vessel;
a removal system for removing at least some of the nominal heat and the decay heat of the reactor simultaneously, the system comprising:
  a closed circuit filled with a heat transfer liquid comprising at least:
    an array of a plurality of U-shaped pipes, arranged in the space between vessels, being distributed about the primary vessel and each extending along the primary vessel with the bottom of the U shapes facing the bottom of the latter,
    a first collector, referred to as first cold collector, connected to one of the branches of the U, referred to as cold branch, of each of the pipes in the array, the cold collector being arranged on the outside above the closure slab,
    a second collector, referred to as first hot collector, connected to the other one of the branches of the U, referred to as hot branch, of each of the pipes in the array, the hot collector being arranged on the outside above the closure slab,
    a plurality of monotube exchangers, one end of which is connected to the first cold collector and the other end of which is connected to the first hot collector,
  the circuit being configured such that the heat transfer liquid flows therein by natural convection and remains in the liquid state both during nominal operation of the nuclear reactor and during shutdown operation of the nuclear reactor releasing decay heat;
  a cold source comprising at least one modular reservoir arranged at a distance from the primary vessel and above the closure slab, the reservoir comprising a third collector, referred to as second cold collector, connected to the first cold collector, a fourth collector, referred to as second hot collector, connected to the first hot collector arranged above the second cold collector and connected to the latter via the plurality of monotube exchangers, a plurality of modules arranged in at least one row of boxes, each module containing a phase change material (PCM) of solid-liquid type confined in a casing and being arranged so as to be cooled by one of the plurality of monotube exchangers, and a support structure supporting at least the second hot collector and the plurality of boxes, the PCM present in each module being designed, during exchange with the liquid metal circulating in the monotube exchanger, to be in the solid state during nominal operation of the nuclear reactor and to transition to the liquid state in an accident condition of the nuclear reactor in which decay heat is released.

According to an advantageous variant, the tubes of the monotube exchangers have a straight shape.

According to an advantageous embodiment, the support structure also supports the second cold collector.

Advantageously, each module has a cubic overall shape, a single corner or notch of which has a shape designed to allow the passage of a monotube exchanger.

Typically, the casing of each module is made of stainless steel 439 (at least 17% Cr and 1% Ti). This ferritic steel is resistant to corrosion, a good heat conductor, has a lower coefficient of thermal expansion than stainless steels of 304/316 type. It can likewise be used to allow good magnetic fixation in order to be gripped by handling machines.

According to an advantageous embodiment variant, the PCM filling each module is, in the solid state, in the form of one or more blocks, preferably made of Zamak, arranged preferably being held in place inside each module by one or more springs. Zamak, which has a melting temperature of approximately 385° C., makes it possible to absorb most of the heat by virtue of its significant thermal inertia and latent heat, while still keeping the temperature of the heat transfer fluid at a temperature below the critical operating temperature of the primary vessel. A spacing between the walls of the module and the blocks of Zamak is preferably provided in order to compensate expansion for operation in an accident scenario.

In an advantageous embodiment, a sliding mechanism, preferably in the form of rolling bearings, is arranged under each module and incorporated in the support structure. Such a mechanism makes it possible to automatically move a module with compensation of an expansion thereof after it is heated during an accident phase.

Advantageously, the arrangement of the boxes delimits spaces forming handling corridors.

According to an advantageous embodiment, a double wall is incorporated in the monotube exchanger. It is located in free contact with the elementary modules that will cool it, the double wall being filled with an inert gas, typically helium. This double wall is advantageously made of austenitic stainless steel, of 316 type. Its function is to avoid direct contact between the heat transfer fluid and the air, or heat transfer medium leakage and liquid PCM in the event of the heat transfer medium leaking through an exchanger tube. The space between walls is filled with helium, in order to improve the thermal conductivity and to allow leaks to be detected.

Thus, the system according to the invention, like that of the aforementioned application FR3104311A1, performs the decay heat removal (DHR) function and ensures that the radioactivity is contained by preserving the integrity of the first radiological barrier (fuel cladding) and the second (main vessel).

The invention therefore consists essentially in producing a nuclear reactor incorporating a system which simultaneously ensures:

decay heat removal in a completely passive way from the moment an accident starts;

heat removal through the primary vessel;

reduction in the risk of chemical interaction between sodium (or NaK) and the material acting as the final cold source;

the presence of a final cold source providing the same function as sodium/air or NaK/air exchangers that are used in the prior art, but having a different nature (reservoir with PCM).

The DHR system according to the invention is therefore distinguished from prior art systems in that the heat is removed passively, via the outside of the primary vessel, making use of the fact that at high temperatures it radiates toward the space between vessels. By contrast to the prior art systems, there is no need of auxiliary systems to assist the circulation of the internal fluid.

Unlike the aforementioned application FR3104311A1, the cold source is modular and comprises a plurality of modules each of which is filled with a PCM and which are grouped together in assemblies, each cooled by a monotube exchanger, an additional hot and cold collector ensuring the distribution of the heat transfer fluid in the plurality of exchangers.

Thus, the DHR system according to the invention, in comparison with that from the application FR3104311A1, makes it possible to improve the distribution of heat within the PCM and to increase the exchange surface area toward the outside, this being useful for dispersing some of the heat by radiation through the walls of the boxes.

In other words, in comparison to the system of the application FR3104311A1, the following is ensured:

more efficient distribution of heat in the PCM, with coupling of a fixed and equivalent number of modules (and boxes) by the exchanger tube;

the thermal expansion of the structures and of the PCM in an accident scenario and during phase transitions is taken into account;

a PCM (Zamak), advantageously in the form of blocks, which is better performing in terms of volumetric latent heat and thermal inertia than cadmium;

easier implementation, by virtue of the use of modules, to be stored in tiers on a support structure. The storage is carried out using handling machines, the passage of which is enabled by corridors freed up by the spaces between boxes. It is likewise easier to inspect each module, and therefore the overall system, too.

The system thus has strong diversification and disruption aspects with respect to the other known and used DHR systems, which confer on it improved passive safety features and no intervention delays, given the permanent circulation of the internal fluid. The idea is that, in the event of a station blackout (SBO), the DHR function is ensured without the need for command-control, an operator or an external cold source. Reference is thus made to intrinsic safety, or a "walk-away safe" reactor.

The DHR system runs permanently, both during normal operation of the reactor with nominal heat and during accident operation.

During nominal operation, the DHR system according to the invention removes the heat deriving from the temperature difference between the primary vessel and the array of pipes.

The decay heat is removed in a completely passive way, from the start of the accident, via the permanent natural circulation of the internal heat transfer fluid, which likewise takes place during normal operation. This permanent natural circulation is made possible by virtue of the significant difference in density of the fluid between the hot and cold branches of the U-shaped pipes, and by virtue of their height.

The removal of the heat through the primary vessel is advantageous since this function may also be ensured a priori in the event of a serious accident or earthquake, this causing significant deformations of the structures inside the vessel. In such extreme conditions, systems inside the vessel, like the existing ones, could not properly perform this safety function.

The presence of a cold source with double-walled monotube exchangers ensures a reduction in the risk of chemical interaction between sodium (or NaK) and the material providing the cooling function (PCM).

The diversification of the cold source, and the passive operation of the DHR system according to the invention strengthen the concept of safety of the installation with respect to external attacks and failure of another system.

Moreover, the utilization of a PCM makes it possible to obtain more compact dimensions than a final cold source of liquid metal/air type.

If necessary, it is possible to envisage the addition of heat pumps to improve the circulation flow rate of the heat transfer liquid within the closed circuit.

The invention applies to all liquid sodium cooled nuclear reactors, irrespective of their configuration, characterizing the mode of the primary circuit, of small modular reactor or SMR type, typically having an operating power of between 50 and 200 MWe, specifically:

integral FNRs for which the primary pumps and the exchangers are entirely contained inside the main vessel enclosing the core and are immersed in the cooling fluid of said main vessel through the closure slab of said vessel;

partially integral ("hybrid") FNRs for which only the primary pumps are contained inside the main vessel enclosing the core;

FNRs referred to as "loop-type FNRs" for which the primary pumps and the intermediate heat exchangers are placed in dedicated vessels on the outside of the main vessel of the reactor which now only contains the core and the internal structure, the main vessel and the component vessel being connected by primary pipework.

The heat transfer liquid of the circuit is preferably a liquid metal chosen from among a binary lead/bismuth (Pb—Bi) alloy, a binary sodium-potassium (NaK) alloy, sodium or other ternary alloys of liquid metals.

The PCM filling the reservoir(s) is preferably chosen from among lead, cadmium, Zamak and a mixture of salts composed of 53% KNO3, 40% NaNO2, 7% NaNO.

The hot and cold collectors and pipes of the circuit, and if appropriate the components of the loop, are preferably made of a material selected from among the stainless steel AISI 316L, ferritic steels, nickel-based alloys, Inconel and Hastelloy.

The preferred applications of the invention are small reactors of the GenIV family, notably sodium and lead cooled reactors.

Outside of the safety aspect, the invention may also be utilized for normal operation for greater flexibility in load following.

Other advantages and features of the invention will become more clearly apparent upon reading the detailed description of exemplary embodiments of the invention, which is given by way of non-limiting illustration, with reference to the following figures.

DETAILED DESCRIPTION

Throughout the present application, the terms "vertical", "lower", "upper", "low", "high", "bottom" and "top" are to be understood with reference to a primary vessel filled with liquid sodium, as in a vertical operating configuration.

Figure 1:
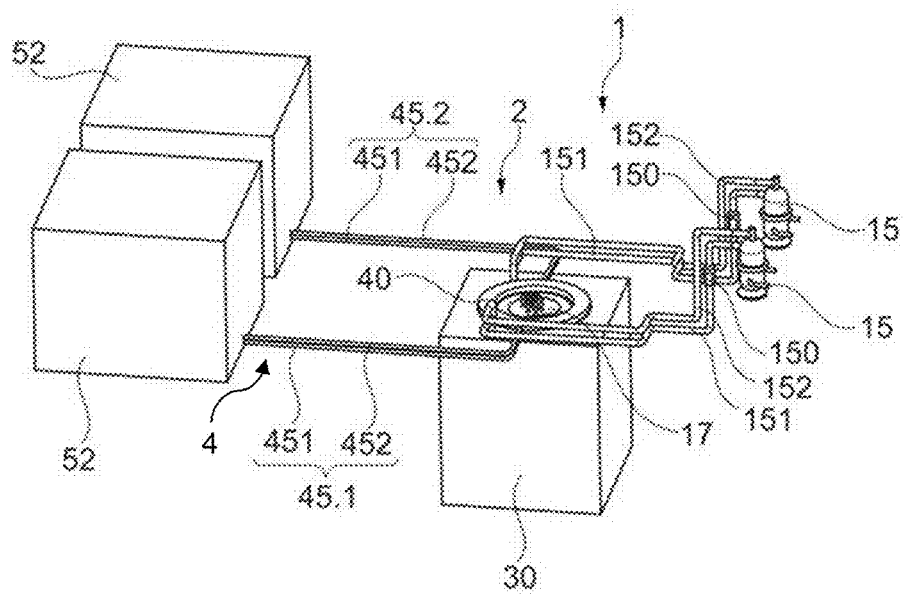
FIG. 1 is a perspective schematic view of a liquid sodium cooled nuclear reactor (SFR) with a DHR system according to the invention.
Figure 2:
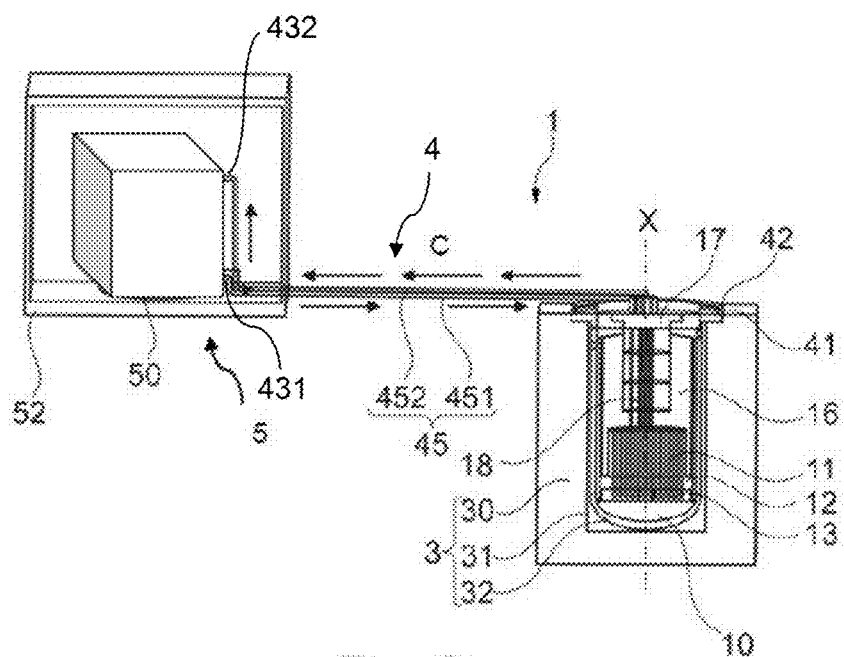
FIG. 2 repeats part of FIG. 1 in a view in partial section.

FIGS. 1 and 2 show a liquid sodium cooled nuclear reactor 1 (SFR), having a loop-type architecture, having a removal system 2 for removing at least some of the nominal heat and the decay heat of the reactor according to the invention simultaneously.

Such a reactor 1 has a primary vessel 10 or reactor vessel which is filled with liquid sodium, referred to as primary liquid, and inside which is the core 11, where a plurality of fuel assemblies 110 that generate the heat energy through fission of the fuel are installed, and assemblies 11 of lateral neutron shields (LNS).

The vessel 10 supports the weight of the sodium in the primary circuit and of the internal components.

The core 11 is supported by two separate structures making it possible to uncouple the support and cooling fluid supply functions from the core:

- a first mechanically pressure welded structure, referred to as diagrid 12, in which are positioned the bases of the fuel assemblies 110 and which is supplied with cold sodium (400° C.) by primary pumps;
- a second mechanically welded structure, referred to as strongback 13, against which the diagrid bears; the strongback generally bears against a part of the internal wall in the bottom part of the primary vessel 10.

Typically, the diagrid 12 and the strongback 13 are made of stainless steel AISI 316L.

The cladding of the assemblies 110 constitute the first containment barrier, while the vessel 10 constitutes the second containment barrier.

As illustrated, the primary vessel 10 has a cylindrical shape of central axis X continued by a hemispherical bottom. Typically, the primary vessel 10 is made from stainless steel AISI 316L with a very low boron content in order to protect against risks of cracking at high temperature. Its external surface is given high emissivity by a preoxidation treatment, carried out to facilitate the radiation of heat toward the outside during the phase of removing the decay heat.

A plug 14, referred to as core cover plug, is arranged vertically above the core 11.

In such a reactor 1, the heat produced during the nuclear reactions within the core 11 is extracted by using pumping means 150, arranged in the reactor vessel 10, to circulate primary sodium toward intermediate exchangers 15 arranged outside the vessel 10 in the example illustrated.

Thus, the heat is extracted via the secondary sodium, arriving cold via its supply duct 152 at an intermediate exchanger 15 before leaving it hot via its outlet duct 151.

The heat extracted is then used to produce water vapor in vapor generators, which are not shown, the vapor produced being supplied to one or more turbines and alternators, which are likewise not shown. The turbine(s) transform(s) the mechanical energy of the vapor into electrical energy.

The reactor vessel 10 is separated into two distinct zones by a separating device constituted by at least one vessel 16 arranged inside the reactor vessel 10. This separating device is also referred to as baffle and is made of stainless steel AISI 316L. In general, as illustrated in FIG. 2, the separating device is constituted by a single interior vessel 16 which has a cylindrical shape, at least in its top part.

Figure 3:
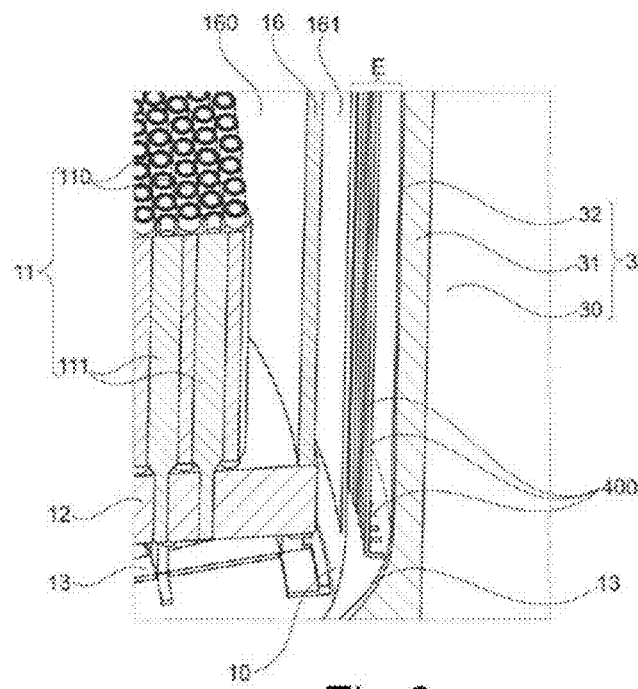
FIG. 3 is a view in partial longitudinal section showing the primary vessel and some of the fuel assemblies of a nuclear reactor SFR and also part of the array of pipes of a DHR system according to the invention.
Figure 4:
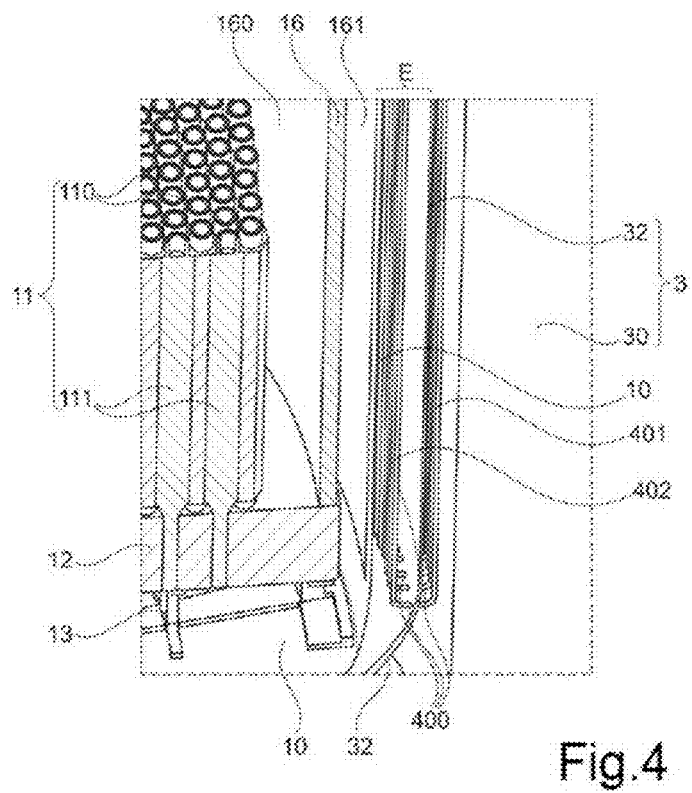
FIG. 4 repeats FIG. 3, but without the presence of a thermally insulating material layer.

The baffle 16 is generally welded to the diagrid 12, as shown in FIGS. 3 and 4.

As illustrated in FIG. 1, the primary sodium zone delimited on the inside by the internal vessel 16 collects the sodium leaving the core 11; it constitutes the zone in which the sodium is at its hottest and it is thus commonly referred to as hot zone 160 or hot collector. The primary sodium zone 161 delimited between the internal vessel 16 and the reactor vessel 10 collects the primary sodium and supplies the pumping means: it constitutes the zone in which the sodium is at its coldest and is thus commonly referred to as cold zone or cold collector 161.

As illustrated in FIG. 2, the reactor vessel 10 is anchored and closed by a closure slab 17 supporting the various components, such as the pumping means, which are not shown, some components of the removal system 2, as will be specified below, and the core cover plug 18. The closure slab 17 is therefore an upper cover confining the liquid sodium inside the primary vessel 10. Typically, the slab 17 is made of unalloyed steel (A42).

The leaktightness of the primary vessel 10 is ensured by a metallic seal between the closure slab 17 and the core cover plug 18.

The core cover plug 18 is a rotary plug that incorporates all the handling systems and all the instrumentation necessary for monitoring the core, comprising control rods, the number of which depends on the type of core and its power, and the thermocouples and other monitoring devices. Typically, the cover plug 18 is made of stainless steel AISI 316L.

The space between the closure slab 17 and the levels free of sodium, commonly referred to as cover-gas plenum, is filled with a gas which is inert with respect to sodium, typically argon.

A support and containment system 3 is arranged around the primary vessel 10 and below its closure slab 17.

More specifically, as shown in FIGS. 3 and 4, this system 3 comprises a vessel pit 30, inside which, from the outside to the inside, a thermally insulating material layer 31, a liner-type sheathing 32 and the primary vessel 10 of the reactor are inserted.

The vessel pit 30 is a block with a parallelepipedal overall outer shape that supports the weight of the slab 17 and therefore of the components that it supports. The vessel pit 30 has the functions of providing biological protection and protection against external attack and also of cooling the external environment in order to maintain low temperatures. The vessel pit 30 is typically a block of concrete.

The thermally insulating material layer 31 ensures the thermal insulation of the vessel pit 30. The layer 31 is typically made of polyurethane foam or silicates.

The liner sheathing 32 ensures retention of the primary sodium in the event of a leak from the primary vessel 10 and protection of the vessel pit 30. The liner 32 bears against the vessel pit 30 and its top part is welded to the closure slab 17. Typically, the liner 32 is made of stainless steel AISI 316L.

The space E between the liner sheathing 32 and the primary vessel, referred to as space between vessels, is filled with a thermally conductive gas, such as nitrogen, in order to cool the surface of the primary vessel 10. It must be sufficient to allow the positioning of the inspection systems used. The thickness of the space E between vessels is typically approximately 30 cm.

The decay heat removal (DHR) system 2 according to the invention for removing decay heat through the primary vessel 10 will now be described, more particularly with reference to FIGS. 3, 6 and 7.

The DHR system 2 according to the invention will make it possible to remove the decay heat outside the primary vessel 10 in a fully passive way by capturing the radiation at high temperatures in the space E between vessels.

The system 2 first of all comprises a closed circuit 4 filled with a liquid metal, which comprises:
- an array 40 of a plurality of U-shaped pipes 400, arranged in the space E between vessels, which pipes are distributed about the primary vessel 10 and each of which extends along the primary vessel 10 with the bottom of the U shapes facing the bottom of the latter,
- a first cold collector 41, welded directly to one of the branches 401 of the U, referred to as cold branch, of each of the pipes in the array, the cold collector being arranged on the outside above the closure slab 17,
- a first hot collector 42, welded directly to the other one of the branches 402 of the U, referred to as hot branch, of each of the pipes in the array, the hot collector being arranged on the outside above the closure slab 17 and preferably vertically above the first cold collector 41,
- a plurality of monotube exchangers 43, one end 431 of which is connected to the first hot collector 42 and the other end 432 of which is connected to the first cold collector 41.

The closure slab 17, on its upper part, supports the weight of the parts that support the cold collector 41 and the hot collector 42.

The closure slab 17 has openings of various types to allow the insertion of each pipe 400 of the array 40. Thus, each tube 400 enters and leaves via the top of the slab 17.

In the case of a loop-type reactor as illustrated, some pipes 400 bypass the branches of the primary circuit if they leave/enter through sides of the primary vessel 10.

As shown in FIG. 4, the cold branches 401 of the U-shaped pipes 400 are inserted completely inside the thermally insulating layer 31 in order to reduce its temperature, and to avoid phenomena of reversing the flow of the fluid and ultimately to allow the natural flow of the liquid metal inside each pipe 400.

The array 40 of pipes has a diameter which is a function of the diameter of the primary vessel 10 and a height which is sufficient to have a surface area necessary for the heat removal that is sought.

In other words, the total number and the dimension of the U-shaped pipes 400 composing the array 40 depends on the diameter of the primary vessel 10 and the power of the core 11 of the nuclear reactor. For example, the pitch of the pipes in the array may be equal to 10 cm, this being a good compromise for the manufacture and the absorption of the heat by radiation.

Likewise for example, the outside diameter of each pipe 400 is fixed at a standard dimension of 5 cm, in order to minimize the head loss, reduce the bulk of the pipes in spaces E between vessels and maximize the surface exposed to the primary vessel 10. The thickness of each pipe depends on the mechanical stresses exerted by the liquid metal inside it and by its weight.

The material of each pipe 400 must have good emissivity characteristics on the side of the hot branch 402 that absorbs the heat. Typically, the material of the pipes is selected from among stainless steel AISI 316L, ferritic steels, nickel, Inconel and Hastelloy. This material depends on the internal fluid used for the closed circuit 4.

This internal heat transfer fluid C is a liquid metal which is chemically stable, has a low viscosity, is a good conductor of heat and a good heat transfer medium, is chemically compatible with all of the pipework of the circuit 4 and is able to operate by natural convection in a temperature range of between 150-600° C. Typically, the liquid metal of the circuit 4 may be selected from among a NaK alloy, Pb—Bi alloy, sodium or one of the ternary alloys of liquid metals, etc.

As shown in FIG. 3, the cold collector 41 and hot collector 42 have a toroidal overall shape centered around the central axis (X) of the primary vessel 10. These collectors 41, 42 bear against support parts 44 directly welded to the closure slab 17.

Each monotube exchanger 43 has the function of removing the heat absorbed by the fluid inside the system 2 by cooling the fluid down as it leaves and by allowing removal of the decay heat that performs better than that of the cold source proposed in the patent application FR1913942. As illustrated, each monotube exchanger 43 is preferably a straight tube. Typically, each monotube exchanger 43 is made of stainless steel AISI 316.

Figure 5:
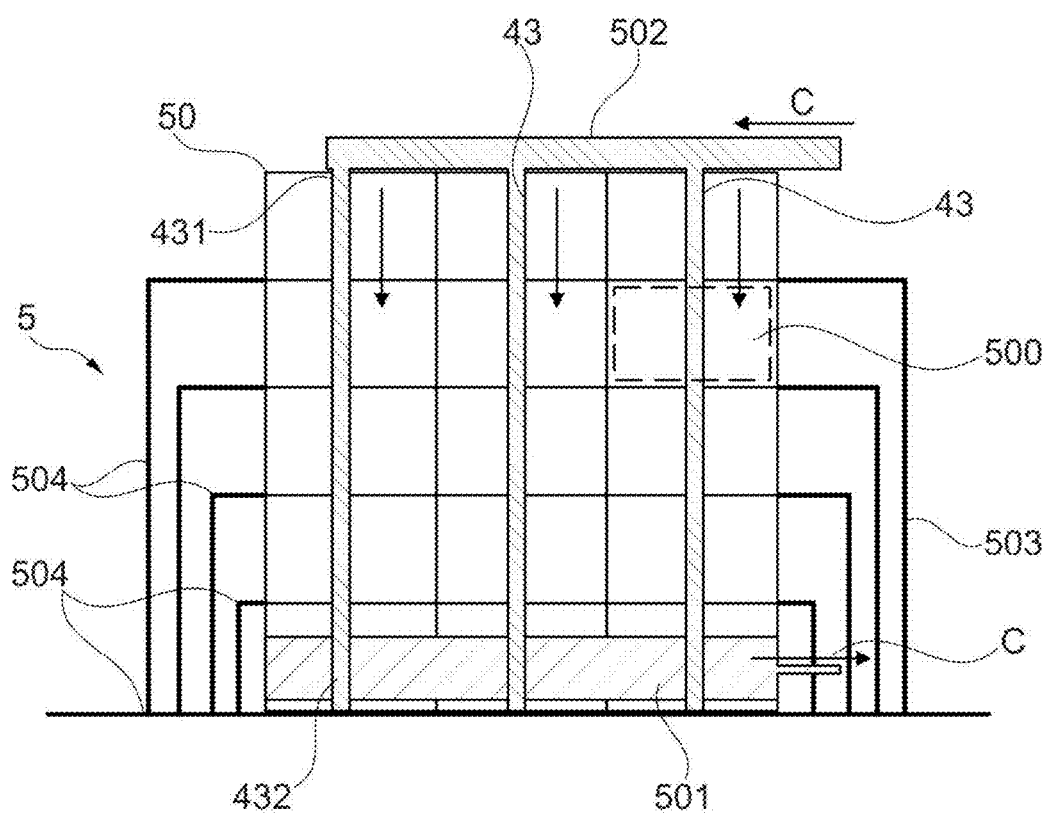
FIG. 5 is a schematic side view of a modular reservoir as cold source of a DHR system according to the invention.

As illustrated in FIGS. 2 and 5, the DHR system 2 according to the invention likewise comprises a cold source 5 configured to absorb the heat removed by radiation from the primary vessel 10 through the entirety of the array 40 of pipes 400. The dimensioning of the cold source 5 depends both on the power of the core 11 of the reactor, which actually determines the decay heat to be removed, and on the envisaged duration of the transit to be supported, which thus requires a substantially proportional thermal inertia.

The cold source 5 comprises at least one reservoir 50, arranged at a distance from the primary vessel 10 and at a higher level than the closure slab 17.

According to the invention, the reservoir 50 is a modularly designed reservoir with a plurality of modules 5000 grouped together in the form of boxes 500 arranged in at least one row, and each module 5000 is formed of a casing 50000 containing a phase change material (PCM) 50001 of solid-liquid type, in the form of blocks.

Figure 6:
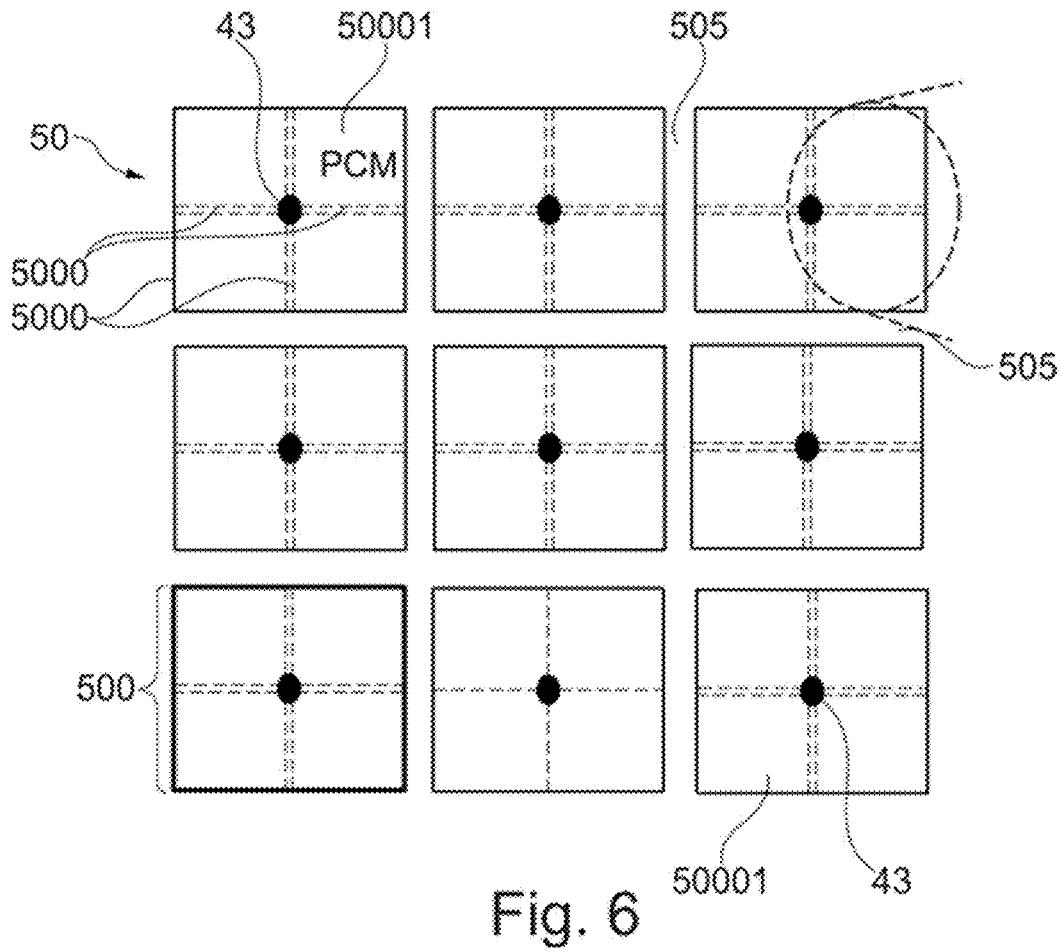
FIG. 6 is a schematic cross-sectional view of the reservoir of FIG. 5 through one tier of modules (boxes).
Figure 6A:
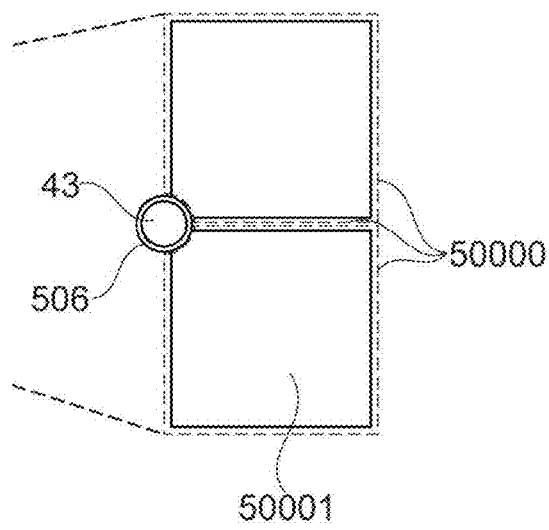
FIG. 6A is a detail view of FIG. 6.

In the example illustrated in FIGS. 5 and 6, the boxes 500 are aligned in multiple rows, the weight of which is supported by the support structure 503. Also as illustrated, each module 5000 has a cubic overall shape, for example with a side of approximately 60 cm. The walls 50000 of each module 5000 are preferably made from ferritic stainless steel, typically from steel 439. Handling is done using a magnetized-arm machine, which can easily take hold of a module via its external surface.

More specifically, the reservoir 50 is arranged at a distance from the primary vessel 10 and above the closure slab 17.

The modular reservoir 50 comprises a second cold collector 501 connected to the first cold collector 41, a second hot collector 502 connected to the first hot collector 42 and arranged above the second cold collector 501 and connected to the latter via the plurality of monotube exchangers 43. More specifically, the end 432 of a monotube exchanger 43 is connected to the second cold collector 501, which itself is connected to the first cold collector 41. And, the end 431 of a monotube exchanger 43 is connected to the second hot collector 502, which itself is connected to the first hot collector 42.

The utilization of a cold collector 501 and a hot collector 502 at the ends of the tubes of exchangers 43 makes it possible to optimally distribute the flow rate of liquid metal heat transfer medium and thus promote its cooling.

Each group of four modules 5000, which forms one box 500, is passed through vertically by one of the straight monotube exchangers 43.

The modular reservoir 50 lastly comprises a support structure 503 supporting the second cold collector 501 and second hot collector 502 and the plurality of boxes 500.

The support structure 503 may advantageously be a mechanically welded assembly of metal profiles 504. The support structure 503 is typically made of steel 304.

As illustrated in FIG. 5, the boxes 500 are preferably relatively arranged in order to create handling corridors 505. These corridors 505 may for example be dimensioned for the passage of handling units equipped with a magnet which can lock each module 5000 and move it due to being attracted to the external ferromagnetic layer of the casing 50000. Such a movement may for example be effected in the event of fusion of the PCM inside the module 5000 or for simple control after a system test.

As is also shown in this FIG. 5, the positioning of the collectors 501, 502 of the modular reservoir is intended to make it possible to leave the handling corridors 505 completely freed up and therefore the handling operations are not made more complex.

The shape of each module 5000 makes it possible to vertically pass a monotube exchanger 43, in which the heat transfer medium C flows by natural convection, through the boxes 500.

Figure 7:
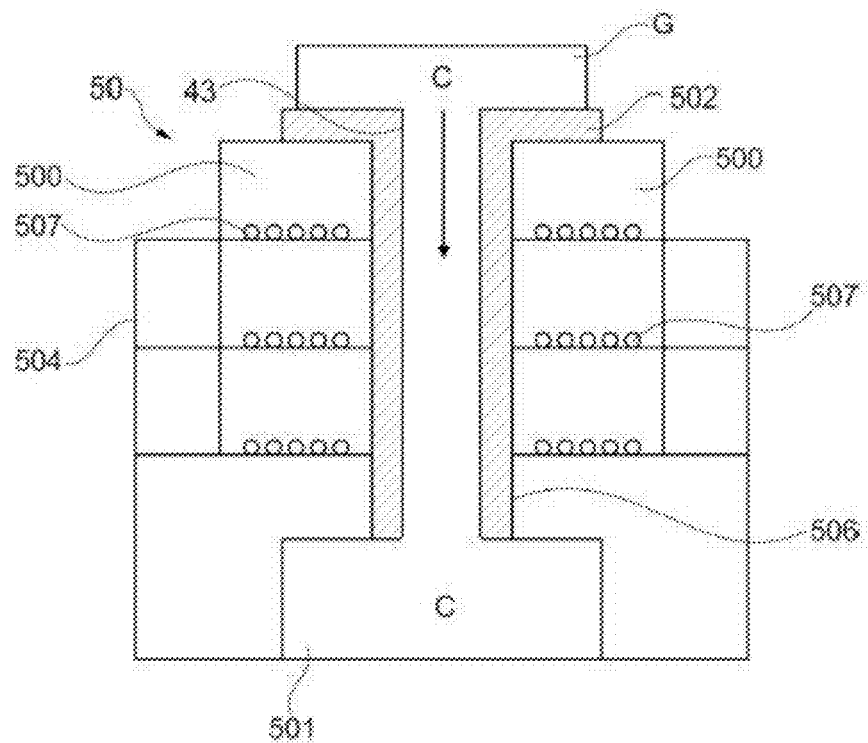
FIG. 7 is a schematic view in longitudinal section through a column of boxes on a support structure of a modular reservoir according to one variant of the invention.

As illustrated in FIG. 7, a monotube exchanger 43 may be spaced apart from direct contact with the modules 5000 by interposing a double wall 506 filled with a noble gas in order to improve the thermal conductivity of the double wall 506 and, if appropriate, to allow leaks to be detected.

This double wall 506 has the function of avoiding direct contact between the air and the heat transfer fluid C, in the event of leakage of the latter from the tube 43, and of avoiding a possible chemical reaction between the heat transfer fluid and the PCM blocks 50001 in the event of an accident.

Typically, the double wall is made of stainless steel 316 or a steel of type 439, the noble gas is helium, the space between walls of the double wall 506 has a thickness of 0.5 mm.

The modular reservoir 50, by natural convection and radiation from the walls of all the boxes 500, disperses a small amount of the heat removed during the accident phase and all of the heat removed by the system 2 while the reactor is operating at nominal power.

The dimensioning of each module 5000 and of the assembly of boxes 500 depends on the PCM that it contains and on the heat to be dispersed during normal operation and also in the event of an accident. The normal operating point (in nominal conditions) influences the dimensions and the total number of modules, whereas the accident scenario influences the required volume of PCM.

The PCM acts as a thermal buffer which is selected, during exchange with the liquid metal of the monotube exchanger, to be in the solid state during nominal operation of the nuclear reactor and to transition to the liquid state during shutdown operation of the nuclear reactor releasing decay heat.

In other words, during the nominal operating phase of the reactor, the PCM is in the solid state and it transmits by conduction the heat relinquished by each monotube exchanger 43, which is then released to the walls of each module 5000 by convection and radiation.

During an accident phase and in a nominal phase, the PCM in the liquid state must store the heat relinquished by the monotube exchanger 43 and therefore cool the liquid metal of the circuit 2.

Figure 8:
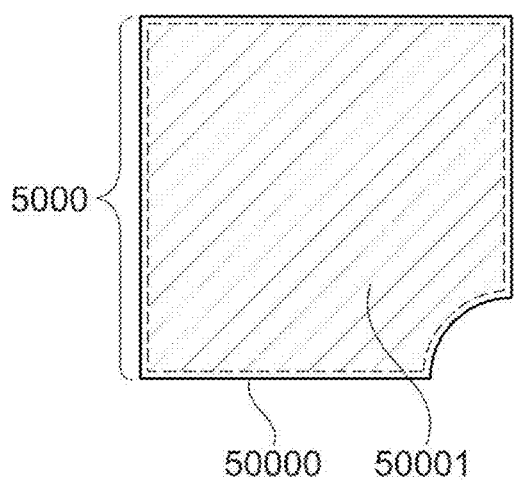
FIG. 8 is a view in section through a module, the shape of which allows free contact with the monotube exchanger, showing its relative arrangement with respect to a block made of Zamak as PCM.
Figure 9:
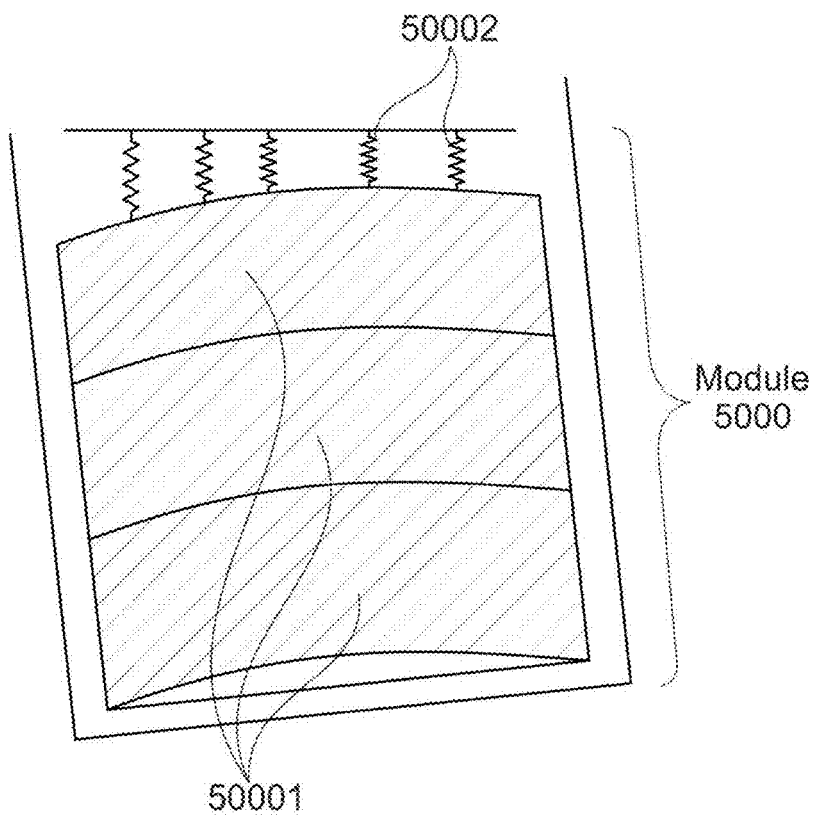
FIG. 9 is a schematic cross-sectional view of the module, of the PCM block inside it, and springs which delimit its lateral movements.

Preferably, in the solid state, the PCM is constituted of blocks 50001 that are arranged and held in place inside each module 5000, as illustrated in FIG. 8. More specifically, as shown in FIG. 9, the blocks 50001 are stacked on top of one another inside each module 5000 in the manner of stacked plates. Specifically, because of the slightly concave shape of the PCM blocks 50001 when they are in the solid state, they can be mutually interlocked.

A spacing between the internal walls of the module 5000 and the blocks 50001 is advantageously provided in order to compensate expansion for operation in an accident scenario. The atmosphere inside each module 5000 is preferably constituted by a noble gas, such as helium, in order to ensure good internal thermal conductivity and efficiently transfer the heat during the initial phase of a transient-type accident involving a station blackout (SBO).

Optional springs 50002 may be arranged at the stack end, between the end block 50001 and the wall of a module 5000, in order to limit the lateral movements of all of the blocks (FIG. 9).

For proper operation in the stationary state, at nominal reactor power, the PCM must have high thermal conductivity.

For proper operation in an accident state, the PCM has characteristics of elevated thermal inertia (elevated specific heat capacity and density), melting point between 250 and 400° C., use temperature between 150° C. (solid state) and 600° C. (liquid state), and elevated latent heat.

Of course, the PCM must also be chemically compatible with the fluid inside the closed circuit 2, such that no problems arise in the event of interaction after a leak from a monotube exchanger 43.

Typically, the PCM is made of Zamak when the heat transfer fluid inside the closed circuit 2 is a NaK alloy, or of lead, when the heat transfer fluid is a Pb—Bi alloy.

During the accident phase, an exchanger tube 43 can radially expand after it is heated.

To compensate this expansion, it is possible to arrange a sliding mechanism 507, forming part of the support structure 503, under each module 5000. As illustrated schematically in FIG. 7, the sliding mechanism 507 may consist of rolling bearings, which make it possible to move the modules 5000, in contact with the tubes 43, in each tier of the support structure 504.

The modular reservoir 50 is preferably contained in a containment building 52. Thus, the final cold source 5 of the system 2 according to the invention is protected against possible external attacks.

The internal walls of the containment building 52 preferably have characteristics of high emissivity, in order to more easily remove the heat radiated by the external walls of the modular reservoir 50 housed there.

In order to put the cold source 5 at an optimum distance from the primary vessel 10, the hydraulic circuit 2 comprises a connecting loop 45 comprising an assembly of pipework and, if appropriate, valves between the cold collector 41 and hot collector 42 and each monotube exchanger 43.

More specifically, as illustrated in FIGS. 1 and 2, the connecting loop 45 comprises a hydraulic branch 451 that connects the first cold collector 41 to the cold end 431 of each monotube exchanger 43 via the second cold collector 501 and a hydraulic branch 452 that connects the first hot collector 42 to the hot end 432 of each monotube exchanger 43 via the second hot collector 502.

Thus, the first cold collector 41 distributes the flow of the liquid metal inside the cold branch 451 toward each cold branch 401 of each tube 400 at the U-shaped bottom and the first hot collector 42 collects the internal liquid metal coming from each hot branch 401 of each tube 400 at the U-shaped bottom to supply it to the hot branch 452.

Advantageously, the cold branch 451 and the hot branch 452 are dimensioned such that they have a length that is as short as possible in order to reduce the head loss therefrom and to increase the natural convection flow rate in the closed hydraulic circuit 4.

Thus, according to the invention, the closed hydraulic circuit 4 that has just been described is configured such that the heat transfer liquid metal flows therein by natural convection and remains in the liquid state both during nominal operation of the nuclear reactor and during shutdown operation of the nuclear reactor releasing decay heat.

During nominal power operation of the reactor, each monotube exchanger is in free contact with each of the modules 5000 making up one box 500. The heat released by the monotube exchanger 43 is transferred by convection and conduction mainly to the PCM in the solid state, typically in the form of Zamak blocks 50001.

During the accident phase, the PCM 50001 becomes liquid and stores the heat relinquished by each exchanger 43 and thus cools the liquid metal inside the closed hydraulic circuit 4.

The configuration that has just been presented, which can be applied to any type of liquid metal cooled reactor, aims to diversify the DHR function with respect to the existing solutions by means of a compact and completely passive system 2, for a station blackout duration of several days, typically approximately 7 days.

The application duration varies depending on the power of the reactor and the size of the modular reservoir 50.

If it is sought to extend still further the operating duration of the thermal buffer (or, by contrast, to shorten it), a greater (or smaller) volume of modular reservoir 50 will be necessary in order to increase (or reduce) the thermal inertia required and the overall storage capacity, depending in the first instance on the total available latent heat.

On the other hand, the power of the reactor directly impacts the total energy to be stored. Therefore, increasing the power of the reactor shortens the duration of usefulness of the modular reservoir 50 if no change is made to the storage capacity, and therefore to the total volume of the PCM.

The inventors have calculated a dimensioning of a module 5000 as elementary module of a reservoir and of a DHR system 2 for an example of a draft of an advanced modular reactor known by the name AMR-SFR ATRIUM, with a power of 400 MWth, a vessel diameter of 8 m and a height of 12 m.

It should be noted that, for the calculations under consideration, the geometry of a module 5000 is cubic and it is made of steel 439.

The results of these calculations are given in Tables 1 and 2 below, respectively.

TABLE 1

| Dimension | Unit (m) |
|---|---|
| Reference external side for a module 5000 at 30° C. | 0.5518 |
| Distance between each side of Zamak block 50001 and steel module 5000 upon installation | 0.0064 |
| Distance between each side of two steel modules 5000 upon installation | 0.0028 |
| External radius of the vertical tube 43 made of steel 316 | 0.0242 |
| Distance between each side of Zamak block 50001 and internal casing 50000 of the module 5000 during operation | 0.0059 |
| Zamak block thickness 50001 during operation | 0.5307 |
| Internal side of a steel module 5000 during operation | 0.5426 |
| External side of a steel module 5000 during operation | 0.5526 |

TABLE 2

| Dimensioning of the assembly of modules in the form of boxes 500 | |
|---|---|
| Mass of Zamak in a module 5000 | 1054 kg |
| Height of an exchanger tube 43 | 10.39 m |
| Number of tiers of boxes 500 heightwise | 18 |
| Total volume of Zamak under installation conditions | 521 m³ |
| Space taken up by a row of tubes 43 and boxes 500 | 7.83 m |
| Space taken up by a handling corridor 505 (that can be used for cooling) | 1.38 m |
| Surface area taken up by a modular reservoir 50 | 125.63 m² |

This application represents an exemplary case. It will be possible to subject it to optimization studies in order to reduce its land use due to increased compactness of the modules 5000 or modification of their arrangement.

The invention is not limited to the examples which have just been described, and it is possible in particular to combine characteristics of the examples illustrated with one another within variants that are not illustrated.

Other variants and embodiments may be envisaged without thereby departing from the scope of the invention.

Although in all of the examples illustrated the DHR system 2 is described with a single modular reservoir 50 and the relevant pipework, this having the advantage of generating a minor footprint, needless to say it is possible to provide multiple modular reservoirs for redundancy (safety) purposes.

The DHR system which has just been described in relation to a loop-type nuclear reactor may be fully implemented in an integral nuclear reactor.

In the case of an integral reactor design, the array 40 of pipes uniformly surrounds the entire primary vessel 10.

In some loop-type reactors, the pipes 400 located at the side of the primary circuit may meet in a micro-collector at the branch, in order to avoid possible hot points for the U-shaped pipes 400 involved.

LIST OF REFERENCES CITED

[1]: HOURCADE E. et al., *"ASTRID Nuclear Island design: update in French-Japanese joint team development of Decay Heat Removal system"*, 2018, ICAPP.

The invention claimed is:

1. A liquid metal cooled fast neutron nuclear reactor, comprising:
 a primary vessel, filled with a liquid metal as heat transfer fluid of a primary circuit of the reactor;
 a vessel pit arranged around the primary vessel defining a space between the vessel pit and the primary vessel;
 a closure slab for confining the liquid metal inside the primary vessel;
 a removal system for removing at least some of nominal heat of the reactor during normal operation and of decay heat of the reactor during shutdown operation, the removal system comprising at least:
 a closed circuit filled with a heat transfer liquid, the closed circuit comprising:
  an array of a plurality of U-shaped pipes, arranged in the space between the vessel pit and the primary vessel, being distributed about the primary vessel and each of the pipes in the array extending along the primary vessel with a bottom of the U shape being adjacent to a bottom of the primary vessel,
  a first cold collector, connected to a cold branch of the U of each of the pipes in the array, the first cold collector being arranged outside of the primary vessel above the closure slab,
  a first hot collector, connected to a hot branch of the U of each of the pipes in the array, the first hot collector being arranged outside of the primary vessel above the closure slab,
  a plurality of monotube heat exchangers, one end of the plurality of monotube heat exchangers is connected to the first cold collector and the other end of the plurality of monotube heat exchangers is connected to the first hot collector, the plurality of monotube heat exchangers are configured to have liquid metal circulating therein,
 the closed circuit being configured such that the heat transfer liquid flows therein by natural convection and remains in a liquid state both during normal operation of the nuclear reactor and during shutdown operation of the nuclear reactor releasing decay heat;
 a cold source comprising at least one modular reservoir arranged at a distance from the primary vessel and above the closure slab, the reservoir comprising a second cold collector, connected to the first cold collector, a second hot collector, connected to the first hot collector, the second hot collector being arranged above the second cold collector and connected to the second cold collector via the plurality of monotube heat exchangers, a plurality of modules arranged in at least one row of boxes, each module containing a phase change material capable of being in a solid state and liquid state, the phase change material being confined in a casing, each module being arranged so as to be cooled by one of the plurality of monotube heat exchangers, and a support structure supporting at least the second hot collector and the boxes, the phase change material present in each module being configured, during heat exchange with the liquid metal circulating in the plurality of monotube heat exchangers, to be in a solid state during normal operation of the nuclear reactor and to transition to the liquid state in an accident condition of the nuclear reactor in which decay heat is released.

2. The nuclear reactor according to claim 1, wherein the nuclear reactor has a loop architecture.

3. The nuclear reactor according to claim 1, wherein the tubes of the monotube heat exchangers have a straight shape.

4. The nuclear reactor according to claim 1, wherein the support structure supports the second cold collector.

5. The nuclear reactor according to claim 1, wherein each module has a cubic overall shape, a single corner or notch of the cubic overall shape has a shape designed to allow passage of a monotube heat exchanger therethrough.

6. The nuclear reactor according to claim 1, wherein at least part of an external wall of each module is coated with a layer of ferromagnetic material.

7. The nuclear reactor according to claim 1, wherein the phase change material in each module is, in the solid state, in a form of one or more blocks.

8. The nuclear reactor according to claim 7, wherein the one or more blocks are arranged inside each module while being held in place by one or more springs.

9. The nuclear reactor according to claim 1, wherein a sliding mechanism is arranged under each module and incorporated in the support structure.

10. The nuclear reactor according to claim 1, wherein an arrangement of the boxes delimits spaces forming handling corridors.

11. The nuclear reactor according to claim 1, wherein a double wall is arranged between a monotube heat exchanger and the modules that the monotube heat exchanger cools, the double wall being filled with a noble gas.

* * * * *